(12) United States Patent
Chung et al.

(10) Patent No.: US 9,036,329 B2
(45) Date of Patent: May 19, 2015

(54) MULTILAYER CAPACITOR AND METHOD OF MANUFACTURING THE SAME

(71) Applicant: SAMSUNG ELECTRO-MECHANICS CO., LTD., Gyeonggi-do (KR)

(72) Inventors: Hae Suk Chung, Seoul (KR); Jae Yeol Choi, Gyeonggi-do (KR); Hyun Woo Kim, Gyunggi-do (KR); Dong Su Cho, Gyeonggi-do (KR)

(73) Assignee: SAMSUNG ELECTRO-MECHANICS CO., LTD., Suwon, Gyeonggi-Do (KR)

( * ) Notice: Subject to any disclaimer, the term of this patent is extended or adjusted under 35 U.S.C. 154(b) by 169 days.

(21) Appl. No.: 13/645,176

(22) Filed: Oct. 4, 2012

(65) Prior Publication Data

US 2013/0083448 A1   Apr. 4, 2013

(30) Foreign Application Priority Data

Oct. 4, 2011   (KR) .................. 10-2011-0100715

(51) Int. Cl.
*H01G 4/005* (2006.01)
*H01G 4/30* (2006.01)
*H01G 4/228* (2006.01)
*H01G 4/224* (2006.01)

(52) U.S. Cl.
CPC .............. *H01G 4/005* (2013.01); *H01G 4/30* (2013.01); *H01G 4/224* (2013.01)

(58) Field of Classification Search
CPC ......... H01G 4/30; H01G 4/012; H01G 4/005; H01G 4/232; H01G 11/80; H01G 4/224; H01G 4/228
USPC .......................... 361/306.3, 301.4, 303, 301.3
See application file for complete search history.

(56) References Cited

U.S. PATENT DOCUMENTS

2012/0039014 A1*   2/2012  Ogawa et al. .............. 361/301.4

FOREIGN PATENT DOCUMENTS

| CN | 101228601 A | 7/2008 |
|---|---|---|
| CN | 101656153 A | 2/2010 |
| JP | 2004-296940 A | 10/2004 |

(Continued)

OTHER PUBLICATIONS

Office Action issued in related Korean Application No. 10-2011-0100715, mailed on Oct. 29, 2012.

(Continued)

*Primary Examiner* — Dion R Ferguson
(74) *Attorney, Agent, or Firm* — McDermott Will & Emery LLP

(57) ABSTRACT

Disclosed herein is a multilayer capacitor comprising: a laminate in which a plurality of first sheets and second sheets are alternately laminated, wherein the first sheets and the second sheets are disposed in a direction perpendicular to a mounting surface; a first inner electrode formed on the first sheets, wherein the first electrode is exposed through upper, lower, and first lateral surfaces of the laminate; a second inner electrode that is formed on the second sheets and has a horizontally symmetrical shape with respect to the first inner electrode; a sealing portion encapsulating the first and second inner electrodes exposed through two lateral surfaces of the laminate; and an external electrode that is electrically connected to the first and second inner electrodes exposed through the upper and lower surfaces of the laminate.

2 Claims, 3 Drawing Sheets

(56) References Cited

FOREIGN PATENT DOCUMENTS

| KR | 10-0593930 B1 | 6/2006 |
| KR | 1020100043518 A1 | 4/2010 |

OTHER PUBLICATIONS

Chinese Office Action issued in Chinese Application No. 2012103762991 dated Mar. 12, 2015, with English Translation.

\* cited by examiner

MULTILAYER CAPACITOR AND METHOD OF MANUFACTURING THE SAME

CROSS REFERENCE(S) TO RELATED APPLICATIONS

This application claims the benefit under 35 U.S.C. Section 119 of Korean Patent Application Serial No. 10-2011-0100715, entitled "Multilayer Capacitor and Method of Manufacturing the Same" filed on Oct. 4, 2011, which is hereby incorporated by reference in its entirety into this application.

BACKGROUND OF THE INVENTION

1. Technical Field

The present invention relates to a multilayer capacitor, and more particularly, to a multilayer capacitor, in which a surface area of an inner electrode is increased as much as possible to reduce bar deformation and cutting defects during lamination or compression, and uneven spacing between the sizes of the final chips may be reduced.

2. Description of the Related Art

In general, a multi-layered ceramic capacitor (MLCC) is a chip-shaped capacitor that charges or discharges electricity and is mounted in a printed circuit board of various electronic products such as a mobile communication terminal, a laptop computer, computer, personal digital assistant (PDA) or the like. The MLCC has various sizes and laminated structures according to the use and capacity thereof.

Also, the MLCC has a structure in which inner electrodes of different polarities are alternately laminated between a plurality of dielectric layers.

The MLCC may be made compact and have a high capacity, and may be easily mounted. Accordingly, the MLCC is widely used as a component of various electronic devices.

However, a compact size and low equivalent serial inductance (ESL) of the MLCC described above are demanded due to the continuous increase in mounting density and a high current and a low voltage of the MLCC.

SUMMARY OF THE INVENTION

An object of the present invention is to provide a multilayer capacitor, which may be mounted with a high integration degree and have low equivalent serial inductance (ESL), and a method of manufacturing the multilayer capacitor.

According to an exemplary embodiment of the present invention, there is provided a multilayer capacitor including: a laminate in which a plurality of first sheets and second sheets are alternately laminated, wherein the first sheets and the second sheets are disposed in a direction perpendicular to a mounting surface; first inner electrodes formed on the first sheets, wherein the first electrodes are exposed through upper, lower, and first lateral surfaces of the laminate; second inner electrodes formed on the second sheets and each having a horizontally symmetrical shape with respect to the first inner electrodes; a sealing portion encapsulating the first and second inner electrodes exposed through two lateral surfaces of the laminate; and external electrodes electrically separated from each other but connected to the first and second inner electrodes, respectively, exposed through the upper and lower surfaces of the laminate.

The external electrodes may be further formed on the two lateral surfaces of the laminate so as to cover the sealing portion.

Also, the sealing portion may be made of a dielectric slurry or an epoxy material.

According to another exemplary embodiment of the present invention, there is provided a method of manufacturing a multilayer capacitor, including: preparing a sheet; forming a plurality of inner electrodes on the sheet; cutting the sheet; forming a laminate by laminating portions of the cut sheet; forming a sealing portion on two lateral surfaces of the laminate; and forming an external terminal on upper and lower surfaces of the laminate.

The method may further include forming an external electrode on the two lateral surfaces of the laminate after the forming of the external electrode.

The sealing portion may be made of a dielectric slurry or an epoxy material.

DESCRIPTION OF THE PREFERRED EMBODIMENTS

Hereinafter, exemplary embodiments of the present invention will be described in detail with reference to the accompanying drawings. However, this is only by way of example and therefore, the present invention is not limited thereto.

When technical configurations known in the related art are considered to make the contents obscure in the present invention, the detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

Figure 1:
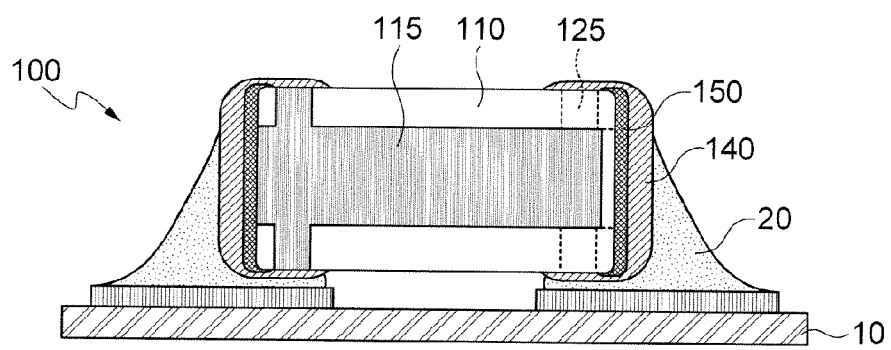
FIG. 1 is a cross-sectional view of a multilayer capacitor according to an embodiment of the present invention.
Figure 2:
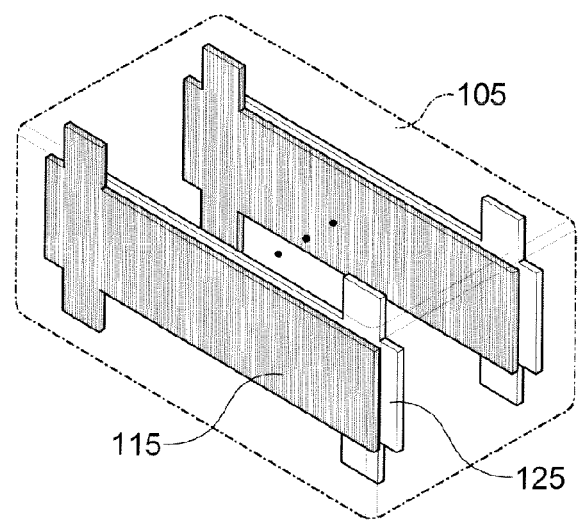
FIG. 2 is a perspective view illustrating the inner electrode illustrated in FIG. 1.
Figure 3:
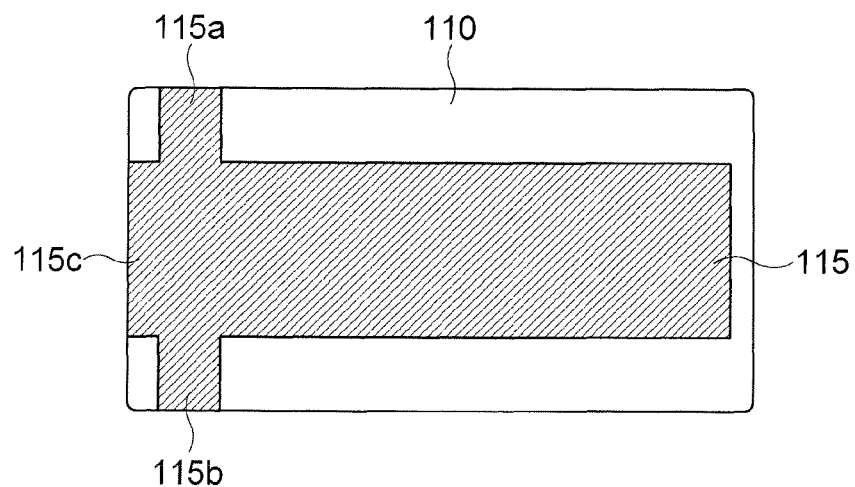
FIG. 3 illustrates a first sheet according to an embodiment of the present invention.
Figure 4:
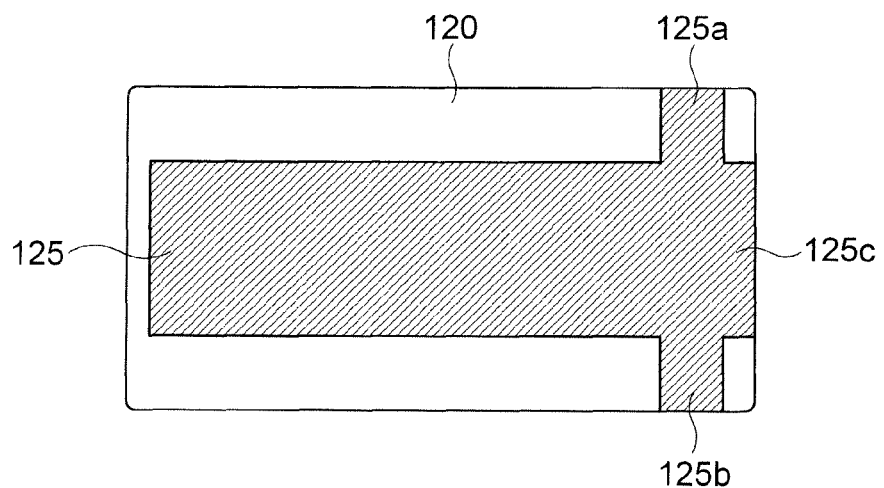
FIG. 4 illustrates a second sheet according to an embodiment of the present invention.

FIG. 1 is a cross-sectional view of a multilayer capacitor 100 according to an embodiment of the present invention. FIG. 2 is a perspective view illustrating an inner electrode 115 illustrated in FIG. 1. FIG. 3 illustrates a first sheet 110 according to an embodiment of the present invention. FIG. 4 illustrates a second sheet 120 according to an embodiment of the present invention.

Referring to FIGS. 1 through 4, the multilayer capacitor 100 includes a laminate 105, a first inner electrode 115, a second inner electrode 125, a sealing portion 150, and an external electrode 140.

The laminate 105 is formed by alternately laminating a plurality of first sheets 110 and second sheets 120 that are disposed in a direction perpendicular to a mounting surface.

That is, the sheets are laminated in a horizontal direction, while being erected in a vertical direction, to thereby form the laminate 105.

Also, as illustrated in FIG. 3, the first inner electrode 115 is placed on the first sheet 110 and is exposed through upper, lower, and first lateral surfaces of the laminate 105. That is, a portion 115a of the first inner electrode 115 is exposed through the upper surface of the laminate 105, and a portion 115b of the first inner electrode 115 is exposed through the lower surface of the laminate 105, and a portion 115c of the first inner electrode 115 is exposed through the first lateral surface of the laminate 105.

Meanwhile, the second inner electrode 125 is disposed on the second sheet 120, and is horizontally symmetrical with respect to the first inner electrode 115. Referring to FIG. 4, a portion 125a of the second inner electrode 125 is exposed through the upper surface of the laminate 105, and a portion 125b of the second inner electrode 125 is exposed through the lower surface of the laminate 105, and a portion 125c of the second inner electrode 125 is exposed through a second lateral surface of the laminate 105.

The portions 115a, 115b, 125a, and 125b of the first and second electrodes 115 and 125 that are exposed through the upper and lower surfaces of the laminate 105 are electrically connected to the external electrode 140, and the first and second inner electrodes 115c and 125c exposed through the two lateral surfaces of the laminate 105 are encapsulated by using the sealing portion 150. Here, the external electrode 140 may be further formed on the two lateral surfaces of the laminate 105.

Also, the sealing portion 150 may be made of a dielectric slurry or an epoxy material. A dielectric material and epoxy are materials having high electrical insulating characteristics, and may prevent the first and second inner electrodes 115 and 125 exposed through the two lateral surfaces of the laminate 105 from being shorted by each other or being electrically connected to the outside.

As described above, according to the multilayer capacitor 100, by providing a surface area of the first and second inner electrodes 115 and 125, as much as possible, through the portions 115c and 125c exposed through the lateral surfaces of the laminate 105 in the first and second inner electrodes 115 and 125, bar deformation during lamination or compression may be reduced, and cutting defects may be prevented.

In addition, as bar deformation is reduced, spread of size of a cut chip is reduced, whereby size spread of a final multilayer capacitor may be reduced.

Figure 5:
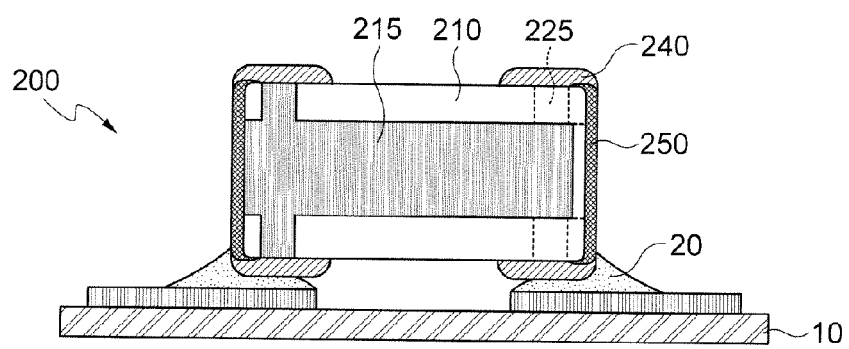
FIG. 5 is a cross-sectional view illustrating a multilayer capacitor according to another embodiment of the present invention.

FIG. 5 is a cross-sectional view of a multilayer capacitor 200 according to another embodiment of the present invention. Referring to FIG. 5, in the multilayer capacitor 200, an external electrode 240 is formed only on upper and lower surfaces of a laminate. Accordingly, a solder portion 20 is formed only a portion under a chip, which is adjacent to a mounting surface of a substrate 10. That is, according to the multilayer capacitor 200 of the present embodiment of the present invention, by vertically disposing inner electrodes, the multilayer capacitor 200 may have low equivalent serial inductance (ESL) and may be mounted with a high degree of integration.

Figure 6:
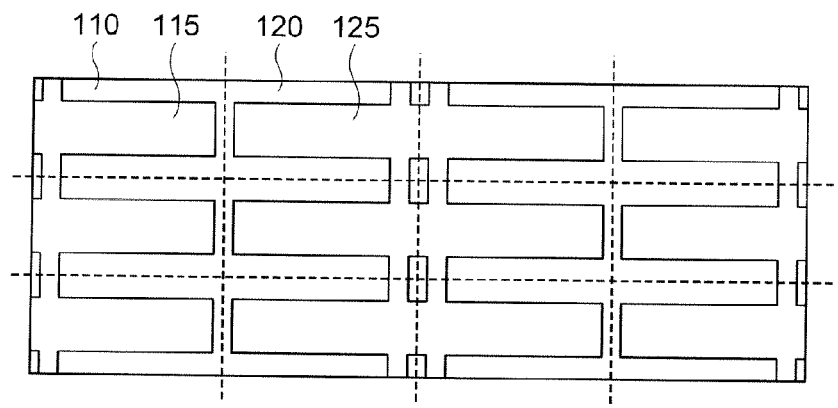
FIG. 6 is a view of a sheet before being cut, according to an embodiment of the present invention.

FIG. 6 illustrates inner electrodes formed on a sheet according to an embodiment of the present invention. Hereinafter, a method of manufacturing a multilayer capacitor according to an embodiment of the present invention will be described with reference to FIG. 6.

According to the method of manufacturing a multilayer capacitor of the present invention, first, a sheet on which inner electrodes are to be formed is prepared, and a plurality of inner electrodes are formed on the sheet. Here, a first inner electrode 115 and a second inner electrode 125 are alternately laminated. That is, a portion of the sheet on which the first inner electrode 115 is formed is a first sheet 110, and a portion of the sheet on which the second inner electrode 125 is formed is the second sheet 120.

Also, the sheet is cut along a dotted line illustrated in FIG. 6. By cutting the sheet in this manner, the first sheet 110 on which the first inner electrode 115 is formed and the second sheet 120 on which the second inner electrode 125 is formed may be obtained.

Next, the laminate 105 is formed by alternately laminating the first sheet 110 and the second sheet 120 that are cut. Here, the first inner electrode 115 is formed such that portions of the first electrode 115 are exposed through upper, lower, and first lateral surfaces of the laminate 105, and the second inner electrode 125 has a horizontally symmetrical shape with respect to the first inner electrode 115.

Next, a sealing portion 150 is formed on two lateral surfaces of the laminate 105. The sealing portion 150 encapsulates the first and second inner electrodes 115 and 125 exposed through the two lateral surfaces of the laminate 105. The sealing portion 150 may be made of a dielectric slurry or an epoxy material. A dielectric material and an epoxy are materials having high electrical insulating characteristics, and may prevent the inner electrodes exposed through the two lateral surfaces of the laminate 105 from being shorted from each other or from being electrically connected to the outside.

Finally, by forming an external terminal 140 that is electrically connected to the inner electrodes exposed through the upper and lower surfaces of the laminate 105, the manufacture of a multilayer capacitor according to the present invention is completed.

In addition, the method of manufacturing a multilayer capacitor according to the present invention may further include forming another external terminal 140 on the two lateral surfaces of the laminate, after the forming of the external terminal 140.

According to a multilayer capacitor and a method of manufacturing the same of the embodiments of the present invention, bar deformation during lamination or compression may be reduced, and cutting defects may be prevented.

In addition, uneven spacing between the sizes of cut chips may be reduced, and thus, uneven distribution in size of a final multilayer capacitor may be reduced. Also, a multilayer capacitor having a low equivalent serial inductance (ESL) may be mounted with a high degree of integration by vertically disposing inner electrodes of the multilayer capacitor.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

Accordingly, the scope of the present invention is not construed as being limited to the described embodiments but is defined by the appended claims as well as equivalents thereto.

What is claimed is:
1. A multilayer capacitor comprising:
   a laminate in which a plurality of first sheets and second sheets are alternately laminated, wherein the first sheets and the second sheets are disposed in a direction perpendicular to a mounting surface;
   first inner electrodes formed on the first sheets, wherein the first electrodes are exposed through upper, lower, and first lateral surfaces of the laminate;

second inner electrodes formed on the second sheets and each having a horizontally symmetrical shape with respect to the first inner electrodes;

a sealing portion encapsulating the first and second inner electrodes exposed through two lateral surfaces of the laminate; and external electrodes electrically separated from each other but connected to the first and second inner electrodes, respectively, exposed through the upper and lower surfaces of the laminate, wherein the sealing portion is made of a dielectric slurry or an epoxy material.

2. The multilayer capacitor according to claim 1, wherein the external electrodes are further formed on the two lateral surfaces of the laminate so as to cover the sealing portion.

* * * * *